Figures 1, 2:
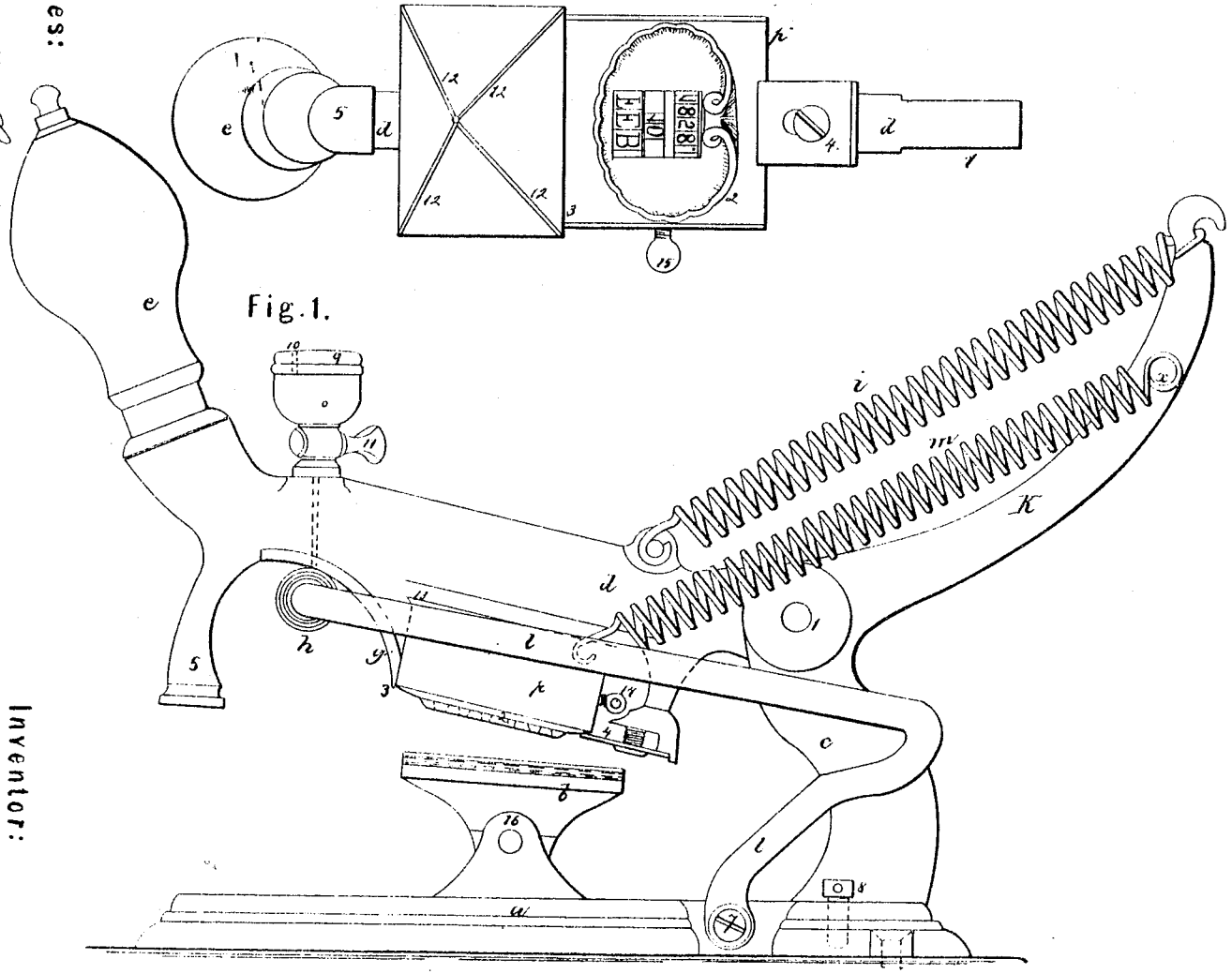

BEST AVAILABLE COPY

S. J. Smith.
Hand Stamp.
No. 198. Patented Apr. 6. 1858

Witnesses:
Lemuel W. Serrell
Thomas G. Harold

Inventor:
Sam'l J. Smith